United States Patent
Zhou et al.

(10) Patent No.: US 12,020,467 B2
(45) Date of Patent: Jun. 25, 2024

(54) METHOD AND APPARATUS FOR OPTIMIZING TAG OF POINT OF INTEREST, ELECTRONIC DEVICE AND COMPUTER READABLE MEDIUM

(71) Applicant: BEIJING BAIDU NETCOM SCIENCE AND TECHNOLOGY CO., LTD., Beijing (CN)

(72) Inventors: Jingbo Zhou, Beijing (CN); Renjun Hu, Beijing (CN); Airong Jiang, Beijing (CN); Jianguo Duan, Beijing (CN); Hui Xiong, Beijing (CN)

(73) Assignee: BEIJING BAIDU NETCOM SCIENCE AND TECHNOLOGY CO., LTD., Beijing (CN)

( * ) Notice: Subject to any disclaimer, the term of this patent is extended or adjusted under 35 U.S.C. 154(b) by 830 days.

(21) Appl. No.: 17/037,144

(22) Filed: Sep. 29, 2020

(65) Prior Publication Data
US 2021/0254992 A1    Aug. 19, 2021

(30) Foreign Application Priority Data
Feb. 13, 2020   (CN) .......................... 202010090134.2

(51) Int. Cl.
*G06V 10/44*    (2022.01)
*G01C 21/36*    (2006.01)
(Continued)

(52) U.S. Cl.
CPC ....... *G06V 10/454* (2022.01); *G01C 21/3608* (2013.01); *G01C 21/3682* (2013.01);
(Continued)

(58) Field of Classification Search
CPC .... G06V 10/454; G06V 10/761; G06V 10/82; G01C 21/3608; G01C 21/3682;
(Continued)

(56) References Cited

U.S. PATENT DOCUMENTS

| 2011/0113040 A1 | 5/2011 | Bickel et al. | |
| 2014/0278291 A1* | 9/2014 | Zheng | G09B 29/007 703/2 |
| 2018/0293466 A1* | 10/2018 | Viswanathan | G01C 21/3602 |

FOREIGN PATENT DOCUMENTS

| CN | 109784367 A | 5/2019 |
| CN | 109903117 A | 6/2019 |

(Continued)

OTHER PUBLICATIONS

Gandhi, Siamese Network & Triplet Loss, Towards Data Science, 2018 (Year: 2018).*

(Continued)

*Primary Examiner* — Aniss Chad
*Assistant Examiner* — Shien Ming Chou
(74) *Attorney, Agent, or Firm* — COZEN O'CONNOR

(57) ABSTRACT

The present disclosure provides a method for optimizing a tag of a point of interest s(POI). The method includes: obtaining first portrait feature data of each POI in a plurality of POIs and second portrait feature data of each tag in a plurality of marked tags corresponding to the plurality of POIs; mapping the first portrait feature data of each POI and the second portrait feature data of each tag to a metric space to obtain a first feature vector of each POI and a second feature vector of each tag; and optimizing at least one marked tag corresponding to a target POI based on a vector similarity between a first feature vector of the target POI and a second feature vector of at least one tag. The present disclosure provides an apparatus for optimizing a tag of a POI, an electronic device and a computer readable medium.

13 Claims, 5 Drawing Sheets

(51) Int. Cl.
  *G06F 18/2113* (2023.01)
  *G06N 3/045* (2023.01)
  *G06V 10/74* (2022.01)
  *G06V 10/82* (2022.01)

(52) U.S. Cl.
  CPC ......... *G06F 18/2113* (2023.01); *G06N 3/045* (2023.01); *G06V 10/761* (2022.01); *G06V 10/82* (2022.01)

(58) Field of Classification Search
  CPC ............. G01C 21/3679; G06F 18/2113; G06F 16/9537; G06F 16/9535; G06N 3/045
  See application file for complete search history.

(56) References Cited

FOREIGN PATENT DOCUMENTS

| | | |
|---|---|---|
| CN | 110209908 A | 9/2019 |
| CN | 110309405 A | 10/2019 |
| CN | 110781321 A | 2/2020 |
| JP | 2011003151 A * | 1/2011 |
| WO | WO 2018112696 A1 | 6/2018 |
| WO | WO 2018157818 A1 | 9/2018 |

OTHER PUBLICATIONS

Gomez, Understanding Ranking Loss, Contrastive Loss, Margin Loss, Triplet Loss, Hinge Loss and all those confusing names, github.io, 2019 (Year: 2019).*
JP-2011003151-A Translation (Year: 2011).*
Xie, Learning Graph based POI Embedding for Location-based Recommendation, CIKM 2016 (Year: 2016).*
Xie, "Learning Graph-based POI Embedding for Location-based Recommendation", CIKM 16 (Year: 2016).*
Chinese Patent Application No. 202010090134.2, Office Action dated Feb. 25, 2023, 6 pages.
Chinese Patent Application No. 202010090134.2, English translation of Office Action dated Feb. 25, 2023, 12 pages.
Zhao, S. "Research on Multi-Domain Resources Recommendation Methods Based on Neural Network" Thesis, May 2019, 59 pages.
Kakaletsis, E. et al. "Label Propagation on Facial Images Using Similarity and Dissimilarity Labelling Constraints" ICIP 2018, pp. 783-787.

* cited by examiner

S1 for each POI, extracting a descriptive feature of the POI from a first knowledge map obtained in advance to form the first portrait feature data of the POI — S101a for each tag, extracting a descriptive feature of the tag from a second knowledge map obtained in advance to form the second portrait feature data of the tag — S102a

FIG. 3a

S1 for each POI, determining historical accessing users and/or historical search users corresponding to the POI, and aggregating user portraits of the historical accessing users and/or the historical search users corresponding to the POI to obtain the first portrait feature data of the POI — S101b for each tag, determining at least one POI corresponding to the tag, and generating the second portrait feature data of the tag based on first portrait feature data of the at least one POIs corresponding to the tag — S102b

FIG. 3b

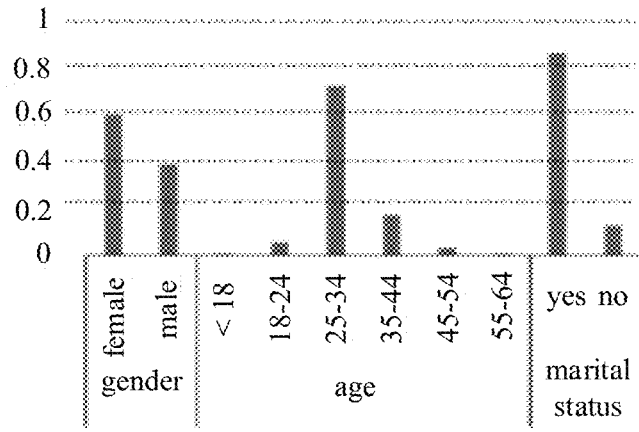

FIG. 4

METHOD AND APPARATUS FOR OPTIMIZING TAG OF POINT OF INTEREST, ELECTRONIC DEVICE AND COMPUTER READABLE MEDIUM

CROSS-REFERENCE TO RELATED APPLICATION

This application claims priority to and benefits of Chinese Patent Application Serial No. 202010090134.2, filed the State Intellectual Property Office of P. R. China on Feb. 13, 2020, the entire content of which is incorporated herein by reference.

FIELD

Embodiments of the present disclosure relate to a field of computer technologies, and more particularly to a method and an apparatus for optimizing a tag of a point of interest (POI), an electronic device, and a computer readable medium.

BACKGROUND

A tag of a point of interest (POI) is important basic data for a map application to provide a service. In the map application, the tag of the POI can help a user find a corresponding POI quickly. For example, when the user searches for a "hotel", all POIs corresponding to a tag of the "hotel" can be returned to the user, such that the user can quickly find a POI for providing a related service. In addition, the tag of the POI plays an important role in a scene for recommending the POI such as a location-based advertisement.

Presently, there are two conventional ways for marking the tag of the POI. First, the tag of the POI is manually marked by the user in a way of crowdsourcing. Second, the tag is extracted from comments related to the POI to mark the POI by employing a natural language processing technology.

SUMMARY

Embodiments of the present disclosure provide a method for optimizing a tag of a point of interest (POI). The method includes: obtaining first portrait feature data of each POI in a plurality of POIs and second portrait feature data of each tag in a plurality of marked tags corresponding to the plurality of POIs; mapping the first portrait feature data of each POI and the second portrait feature data of each tag to a metric space to obtain a first feature vector of each POI and a second feature vector of each tag; and optimizing at least one marked tag corresponding to a target POI based on a vector similarity between a first feature vector of the target POI and a second feature vector of at least one tag.

Embodiments of the present disclosure also provide an electronic device. The electronic device includes: one or more processors and a storage device. The storage device has one or more programs stored thereon. When the one or more programs are executed by the one or more processors, the one or more processors are caused to implement the method for optimizing the tag of the POI according to the first aspect.

Embodiments of the present disclosure provide a computer readable medium. The computer readable medium has a computer program stored thereon. The method for optimizing the tag of the POI according to the first aspect is implemented when the computer program is executed by a processor.

BRIEF DESCRIPTION OF THE DRAWINGS

The accompanying drawings are used to provide a further understanding for embodiments of the present disclosure and constitute a part of the specification, and are also used to explain the present disclosure together with the embodiments of the present disclosure, but do not constitute a limitation of the present disclosure. The above and other features and advantages may become more apparent to the skilled in the art by describing detailed exemplary embodiments with reference to the accompanying drawings, in which:

FIG. 3a is a flow chart illustrating an alternative implementation of an action at block S1 according to an embodiment of the present disclosure;

FIG. 3b is a flow chart illustrating another alternative implementation of an action at block S1 according to an embodiment of the present disclosure;

FIG. 4 is a schematic diagram illustrating an aggregate statistic of user portraits in an exemplary hotel A according to an embodiment of the present disclosure;

DETAILED DESCRIPTION

In order to enable the skilled in the art to better understand the technical solution of the present disclosure, description may be made in detail below to a method and an apparatus for optimizing a tag of a point of interest (POI), an electronic device and a computer readable medium provided by the present disclosure with reference to the accompanying drawings.

Example embodiments will be described more fully below with reference to the accompanying drawings. However, the example embodiments may take different forms and should not be construed to limit embodiments explicitly set forth herein. On the contrary, these embodiments are provided so that the present disclosure will be thorough and complete, and will fully convey the scope of the present disclosure to those skilled in the art.

Embodiments of the present disclosure and features in the embodiments may be combined with each other without conflict.

As used herein, the term "and/or" includes any and all combinations of one or more associated listed items.

The terms used herein are for the purpose of describing particular embodiments, and not intended to limit the present disclosure. The singular forms "a", "an" and "the" are also intended to include the plural forms, unless indicated otherwise. It should also be understood that, when used in the specification, terms "comprising" and/or "including" specify the presence of stated features, wholes, steps, operations, elements and/or components, but do not exclude the presence or addition of one or more other features, wholes, steps, operations, elements, components and/or groups thereof.

Unless otherwise defined, all terms (including technical and scientific terms) used herein have the same meaning as commonly understood by the skilled in the art. It should be understood that, terms defined in a commonly used dictionary should be construed to have a meaning consistent with their meaning in the context of the related art and the present disclosure, and will not be construed in an idealized or overly formal sense, unless limited expressly by the present disclosure.

Figure 1:
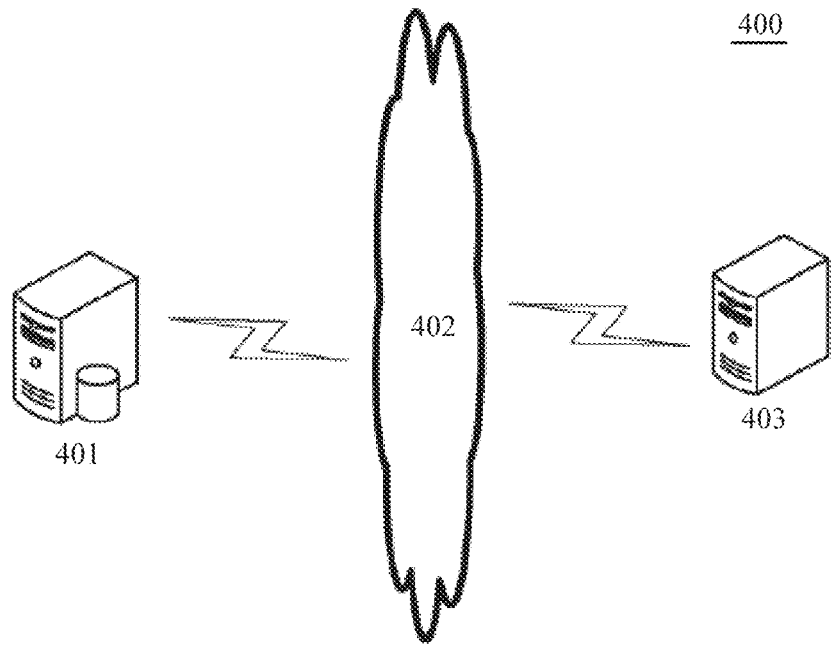
FIG. 1 is a schematic diagram illustrating a system architecture applicable of a method for optimizing a tag of a point of interest (POI) according to an embodiment of the present disclosure.

FIG. 1 is a schematic diagram illustrating a system architecture applicable of a method for optimizing a tag of a point of interest (POI) according to an embodiment of the present disclosure. As illustrated in FIG. 1, the system architecture 400 may include a database server 401, a network 402 and a server 403. The network 402 is configured as a medium for providing a communication link between the database server 401 and the server 403. The network 402 may include various connection types, such as wired, wireless communication links or fiber optic cables.

The database server 401 may be configured to store POIs and tags corresponding to the POIs in a map application.

The server 403 may be a server that provides various services, such as a tag optimization server. The tag optimization server may analyze and process data such as a POI set and a subset of marked tags corresponding to each POI in the POI set, and optimize the subset of marked tags corresponding to the POI based on a processed result.

It should be noted that the server 403 may be hardware or software. When the server 403 is the hardware, it may be implemented as a distributed server cluster composed of a plurality of servers, or implemented as a single server. When the server 403 is the software, it may be implemented as a plurality of software or software modules (such as, for providing distributed services), or may also be implemented as single software or a software module, which is not limited thereto.

It should be noted that the method for optimizing the tag of the POI according to embodiments of the present disclosure is generally executed by the server 403. Correspondingly, an apparatus for optimizing a tag of a POI is generally disposed in the server 403.

It should be understood that the number of database servers 401, the number of networks 402 and the number of servers 403 in FIG. 1 are only illustrative. There may be any number of database servers, any number of networks and any number of servers according to an implementation requirement. It should be noted that the system architecture 400 may not be disposed with the database server 401 when the server 403 stores the POI set and the subset of marked tags corresponding to each POI in the POI set.

Figure 2:
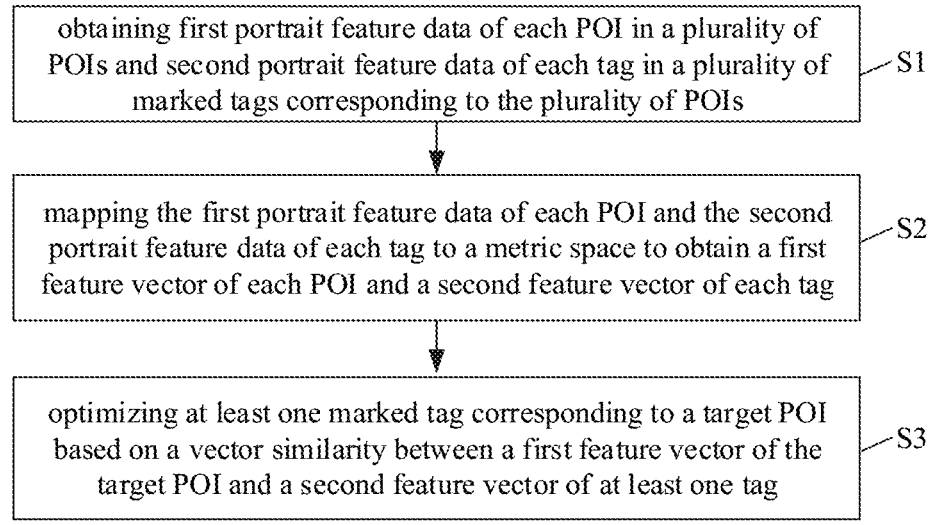
FIG. 2 is a flow chart illustrating a method for optimizing a tag of a point of interest (POI) according to an embodiment of the present disclosure.

FIG. 2 is a flow chart illustrating a method for optimizing a tag of a point of interest (POI) according to an embodiment of the present disclosure. As illustrated in FIG. 2, the method includes the following.

At block S1, first portrait feature data of each POI in a plurality of POIs and second portrait feature data of each tag in a plurality of marked tags corresponding to the plurality of POIs are obtained.

In this embodiment, an executive subject (such as, the server 403 illustrated in FIG. 1) of the method for optimizing the tag of the POI may obtain a POI set and a subset of marked tags corresponding to each POI in the POI set.

The POI set includes a plurality of POIs. Each POI has a corresponding subset of marked tags. The subset of marked tags includes at least one tag which marks a POI corresponding to the tag in advance. In a geographic information system, the POI may include, but be not limited to, a shop, a bus station, a building, a subway station and so on which a user is interested in. The tag marking the POI may be information of the POI, including but not limited to information such as a category and an attribute of the POI. It should be noted that, "marking" the POI with the tag in embodiments of the present disclosure specifically refers to establishing a corresponding relationship between the POI and the tag. For example, the corresponding relationship between the POI and the tag may be established and stored by a data table. The technical solution of the present disclosure does not limit a specific way for establishing the corresponding relationship between the POI and the tag.

Generally, the ways for marking the POI with the tag include, but are not limited to, the following two ways.

Way one: manual marking is employed to mark the POI. Since a match degree between manually marked tag and the POI depends on a seriousness of a manually marking personnel, it is inevitable to introduce some wrong tags.

Way two: the tag is mined from text data related to the POI, and then the POI is marked with the tag. However, in a practical application, except for a few head POIs (including some top-ranked POIs and hot POIs), most of tail POIs do not have enough comment data, causing that few tags are extracted or even no tag may be extracted.

In embodiments of the present disclosure, a union of all subsets of marked tags corresponding all the POIs in the POI set may be obtained as a whole tag set composed of all the tags. The POI set here includes a plurality of POIs, and the tag set here includes a plurality of tags.

Assuming that a POI set includes the number I of POIs and a tag set includes the number J of tags, a POI set P may be denoted by $P=\{p_1, p_2 \ldots p_I\}$, where the i-th POI is represented by $p_i$, $1 \leq i \leq I$, and i is an integer; and a tag set T may be denoted by $T=\{t_1, t_2 \ldots t_J\}$, where the j-th tag is represented by $t_j$, $1 \leq j \leq J$ and j is an integer.

At block S1, portrait feature data may be extracted correspondingly for each POI and each tag by means of feature engineering. In embodiments of the present disclosure, a method for extracting the portrait feature data is mainly based on user behavior data and data of the POI.

Exemplary description will be made below to a detailed implementation for obtaining the first portrait feature data of each POI and the second portrait feature data of each tag in embodiments of the present disclosure with reference to accompanying drawings.

FIG. 3a is a flow chart illustrating an alternative implementation of an action at block S1 according to an embodiment of the present disclosure. As illustrated in FIG. 3a, as an alternative implementation, the action at block S1 includes the following.

At block S101a, for each POI, a descriptive feature of the POI is extracted from a first knowledge map obtained in advance to form the first portrait feature data of the POI.

The knowledge map is a structured semantic knowledge base, which is used to quickly describe concepts in a physical world and correlations of the concepts. The knowledge map generally includes three elements: "entity", "relationship" and "attribute". The "relationship" may also be called "edge relationship", which is used to connect different entities and refers to a connection between the connected entities. The "attribute" is connected with the entity, and the "attribute" and an attribute value corresponding to the "attribute" are used to describe an entity corresponding to the "attribute". A basic unit of the knowledge map is a triplet. The triplet has two forms, which are "entity-relationship-entity" and "entity-attribute-attribute value". The knowledge map may be regarded as a set of triplets.

In embodiments of the present disclosure, taking obtaining first portrait feature data of a certain POI as an example, triplet data including an entity corresponding to the POI is determined from the first knowledge map, and then the first portrait feature data of the POI is generated. It should be noted that, the first portrait feature data of each POI may be represented by a first vector with a first predefined format. That is, the first portrait feature data of respective POIs has a same format. The first predefined format may be manually customized in advance.

At block S102a, for each tag, a descriptive feature of the tag is extracted from a second knowledge map obtained in advance to form the second portrait feature data of the tag.

In embodiments of the present disclosure, taking obtaining second portrait feature data of a certain tag as an example, triplet data including an entity corresponding to the tag is determined from the second knowledge map, and then the second portrait feature data of the tag is generated. It should be noted that, the second portrait feature data of each tag may be represented by a second vector with a second predefined format. That is, the second portrait feature data of respective tags has the same format. The second predefined format may be manually customized in advance.

It should be noted that, with respect to the first predefined format of the first vector representing the first portrait feature data and the second predefined format of the second vector representing the second portrait feature data, the number of dimensions of the first vector may be the same as the number of dimensions of the second vector (for example, the first portrait feature data is represented by a 100-dimensional vector and the second portrait feature data is also represented by a 100-dimensional vector), or the number of dimensions of the first vector may also be different from the number of dimensions of the second vector (for example, the first portrait feature data is represented by a 100-dimensional vector and the second portrait feature data is represented by an 80-dimensional vector). An attribute represented by each dimension of the first vector may be the same as or different from an attribute represented by each dimension of the second vector.

FIG. 3b is a flow chart illustrating another alternative implementation of an action at block S1 according to an embodiment of the present disclosure. As illustrated in FIG. 3b, as an alternative implementation, the action at block S1 includes the following.

At block S101b, for each POI, historical accessing users and/or historical search users corresponding to the POI are determined, and user portraits of the historical accessing users and/or the historical search users corresponding to the POI are aggregated to obtain the first portrait feature data of the POI.

At block S102b, user portraits of users (historical accessing users and/or historical search users) related to a certain POI are aggregated and counted to obtain the first portrait feature data of the POI.

FIG. 4 is a schematic diagram illustrating an aggregate statistic of user portraits in an exemplary hotel A according to an embodiment of the present disclosure. As illustrate in FIG. 4, firstly, historical accessing users and/or historical search users of the hotel A are obtained, thereby obtaining a user set related to the hotel A. Then, from different aspects (genders, age stages and marital statuses illustrated in FIG. 4), a proportion of users of each aspect in the user set is counted, and the first portrait feature data of the hotel A may be obtained based on a statistical result.

In the FIG. 4, formats of the first portrait feature data may be: {a proportion of female users, a proportion of male users, a proportion of users younger than 18 years old, a proportion of 18-24 years old, a proportion of 25-34 years old, a proportion of 35-44 years old, a proportion of 45-54 years old, a proportion of 55-64 years old, a proportion of married users and a proportion of unmarried users}.

At S102b, for each tag, at least one POI corresponding to the tag is determined, and the second portrait feature data of the tag is generated based on first portrait feature data of the at least one POIs corresponding to the tag.

At block S102b, as an alternative implementation, an average value of the first portrait feature data of all the POIs corresponding to the tag is determined as the second portrait feature data of the tag. For example, taking obtaining second portrait feature data of a "hotel" tag as an example, first portrait feature data of all POIs marked with the "hotel" tag is averaged at block S101b, to obtain the second portrait feature data of the "hotel" tag. In embodiments of the present disclosure, other algorithm (such as weighted summation) may also be used to obtain the second portrait feature data of the tag based on the first portrait feature data of the at least one POI corresponding to the tag, which is not described here.

It should be noted that, when the second portrait feature data of the tag is obtained based on the first portrait feature data of the at least one POI corresponding to the tag, the first portrait feature data of the POI and the second portrait feature data of the tag may be represented in a same data format.

At block S2, the first portrait feature data of each POI and the second portrait feature data of each tag are mapped to a metric space to obtain a first feature vector of each POI and a second feature vector of each tag.

At block S2, a linear mapping algorithm or a nonlinear mapping algorithm may be employed to perform feature mapping for each POI and each tag (the process may be regarded as feature extraction and dimension reduction for each POI and each tag), so as to obtain the feature vector of each POI and the feature vector of each tag in a same metric space. An employed specific mapping algorithm is not limited in the technical solution of the present disclosure.

Figure 5:
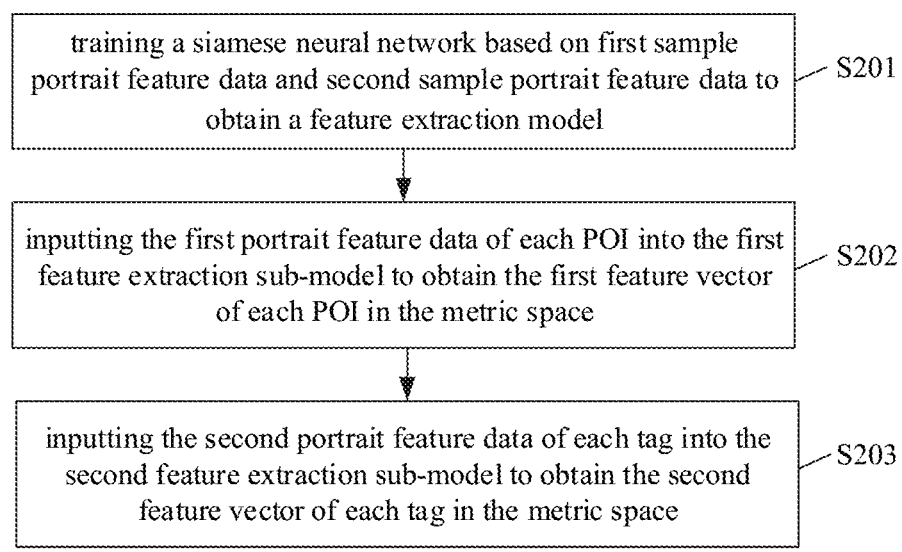
FIG. 5 is a flow chart illustrating an alternative implementation of an action at block S2 according to an embodiment of the present disclosure.

FIG. 5 is a flow chart illustrating an alternative implementation of an action at block S2 according to an embodiment of the present disclosure. As illustrated in FIG. 5, the action at block S2 includes the following.

At block S201, a siamese neural network is trained based on first sample portrait feature data and second sample portrait feature data to obtain a feature extraction model.

The feature extraction model includes a first feature extraction sub-model and a second feature extraction sub-model. The first feature extraction sub-model is configured to map the first portrait feature data to the metric space, and the second feature extraction sub-model is configured to map the second portrait feature data to the metric space.

Figure 6:
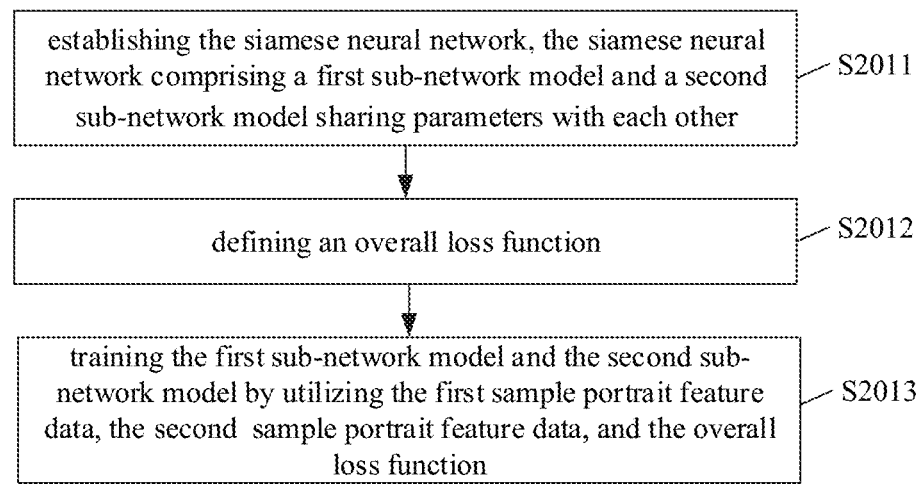
FIG. 6 is a flow chart illustrating an alternative implementation of an action at block S201 according to an embodiment of the present disclosure.

FIG. 6 is a flow chart illustrating an alternative implementation of an action at block S201 according to an embodiment of the present disclosure. As illustrated in FIG. 6, the action at block S201 includes the following.

At block S2011, the siamese neural network is established. The siamese neural network includes a first sub-network model and a second sub-network model sharing parameters with each other.

The first sub-network model is represented by F( ). The second sub-network model is represented by G( ). The first sub-network model and the second sub-network model are two sub-network models in the siamese neural network, which have a siamese relationship and may share model parameters with each other. The first sub-network model F( ) is capable to map the first sample portrait feature data to the metric space, and the second sub-network model G( ) is capable to map the second sample portrait feature data to the metric space At block S2012, an overall loss function is defined.

At block S2013, the first sub-network model and the second sub-network model are trained by utilizing the first sample portrait feature data, the second sample portrait feature data, and the overall loss function.

In some embodiments, the overall loss function defined at block S2012 is denoted by:

$$L = \sum_{p_i \in P, t_j \in T} \text{loss}(\vec{p_i}, \vec{t_j}),$$

where, L represents an overall loss value of the feature extraction model, P represents a POI set including all the POIs, T represents a tag set including all the tags, $p_i$ represents an i-th POI in the POI set, $\vec{p_i}$ represents first portrait feature data of the i-th POI, $t_j$ represents a j-th tag in the tag set, $\vec{t_j}$ represents second portrait feature data of the j-th tag, and $\text{loss}(\vec{p_i}, \vec{t_j})$ represents a loss function of the i-th POI and the j-th tag.

When the tag $t_j$ is not one of at least one of marked tags corresponding to the POI $p_i$, $\text{loss}(\vec{p_i}, \vec{t_j}) = 1 - \cos(F(\vec{p_i}), G(\vec{t_j}))$ is determined, and when the tag $t_j$ is one of the at least one of marked tags corresponding to the POI $p_i$, $\text{loss}(\vec{p_i}, \vec{t_j}) = \max(0, \cos(F(\vec{p_i}), G(\vec{t_j})) - m)$ is determined, where, $F(\vec{p_i})$ represents a feature vector obtained after the first portrait feature data $\vec{p_i}$ is inputted to the first sub-network model, $G(\vec{t_j})$ represents a feature vector obtained after the second portrait feature data $\vec{t_j}$ is inputted to the second sub-network model, $\cos(F(\vec{p_i}), G(\vec{t_j}))$ represents a cosine similarity between the feature vector $F(\vec{p_i})$ and the feature vector $G(\vec{t_j})$, m represents a predefined parameter, 0<m<1, such as m=0.2, and max( ) represents a maximum value function.

The first sub-network model F( ) and the second sub-network model G( ) are trained and optimized by minimizing a value L of the overall loss function. The procedure for training the siamese neural network based on a given sample set and a defined loss function belongs to a conventional technology in the related art, which is not described here. The trained first sub-network model is the first feature extraction sub-model, and the trained second sub-network model is the second feature extraction sub-model. The first feature extraction sub-model is represented by F'( ), and the second feature extraction sub-model is represented by G'( ).

It should be noted that, with respect to the first feature vector outputted by the first feature extraction sub-model F'( ) and the second feature vector outputted by the second feature extraction sub-model G'( ), the number of dimensions of the first feature vector is the same as the number of dimensions of the second feature vector (the numbers of the dimensions of both the two feature vectors may be manually pre-configured or adaptively determined by a model in the training procedure), and a feature of each dimension of the first feature vector is the same as a feature of each dimension of the second feature vector (each dimension of both the two feature vectors is adaptively determined in the training procedure).

At block S202, the first portrait feature data of each POI is inputted into the first feature extraction sub-model to obtain the first feature vector of each POI in the metric space.

The first portrait feature data of the i-th POI is inputted to the first feature extraction sub-model F'( ), to obtain the first feature vector represented by $F'(\vec{p_i})$.

At block S203, the second portrait feature data of each tag is inputted into the second feature extraction sub-model to obtain the second feature vector of each tag in the metric space.

The second portrait feature data of the j-th tag is inputted to the first feature extraction sub-model G'( ), to obtain the second feature vector represented by $G'(\vec{t_j})$.

At block S3, at least one marked tag corresponding to a target POI is optimized based on a vector similarity between a first feature vector of the target POI and a second feature vector of at least one tag.

The vector similarity between the first feature vector and the second feature vector may be obtained by any algorithm for calculating a similarity between two vectors such as a cosine similarity algorithm, an Euclidean distance algorithm and a Pearson correlation coefficient. The calculation solution of the present disclosure does not limit the algorithm for calculating the vector similarity.

At block S3, the target POI is a POI that the users want to optimize the at least one tag corresponding to the POI. In some embodiments, the target POI is each POI in the POI set, that is, the tag corresponding to each POI in the POI set needs to be optimized.

During performing tag optimization process on the target POI, the optimization may be performed based on the vector similarity of between the first feature vector of the target POI and the second feature vector of the at least one tag. In some embodiments, the vector similarity between the first feature vector of the target POI and the second feature vector of each tag may be calculated first, and then the subset of marked tags of the target POI may be optimized based on a calculated result.

In some embodiments, after a vector similarity between the first feature vector of the target POI and a second feature vector of a certain target tag is calculated, corresponding processing may be performed according to a calculated result. The calculated result may be following three conditions 1), 2) and 3). 1) The target tag is not a marked tag corresponding to the target POI, and the vector similarity between the first feature vector of the target POI and the second feature vector of the target tag is greater than a first preset threshold. 2) The target tag is the marked tag corresponding to the target POI, and the vector similarity between the first feature vector of the target POI and the second feature vector of the target tag is lower than a second preset threshold. 3) Other condition.

When the calculated result corresponds to the condition 1), the target tag is added into the at least one marked tag corresponding to the target POI (that is, the target tag is added into the subset of marked tags corresponding to the target POI), thereby implementing an expansion of the marked tags corresponding to the POI. When the calculated result corresponds to the condition 2), the target tag is deleted from the at least one marked tag corresponding to the target POI (that is, the target tag is deleted from the subset of marked tags corresponding to the target POI), thereby implementing to correct the marked tags corresponding to the POI. The second preset threshold is less than or equal to the first preset threshold. When the calculated result is the condition 3), processing is not performed.

With the method for optimizing the tag of the POI according to embodiments of the disclosure, the subset of marked tags corresponding to the target POI may be optimized, and a match degree between the POI and the marked tag is improved.

Figure 7:
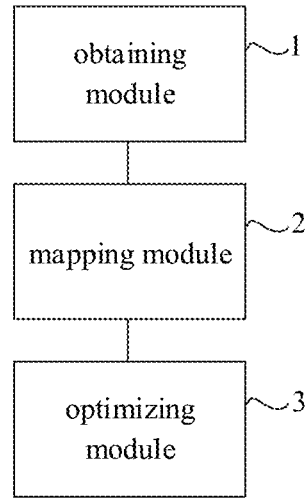
FIG. 7 is a block diagram illustrating an apparatus for optimizing a tag of a point of interest (POI) according to an embodiment of the present disclosure.

FIG. 7 is a block diagram illustrating an apparatus for optimizing a tag of a point of interest (POI) according to an embodiment of the present disclosure. As illustrated in FIG. 7, the apparatus for optimizing the tag of the POI may be configured to implement the method for optimizing the tag of the POI according to the above embodiments. The apparatus for optimizing the tag of the POI includes an obtaining module 1, a mapping module 2, and an optimizing module 3.

The obtaining module 1 is configured to obtain first portrait feature data of each POI in a plurality of POIs and second portrait feature data of each tag in a plurality of marked tags corresponding to the plurality of POIs.

The mapping module 2 is configured to map the first portrait feature data of each POI and the second portrait feature data of each tag to a metric space to obtain a first feature vector of each POI and a second feature vector of each tag.

The optimizing module 3 is configured to optimize at least one marked tag corresponding to a target POI based on a vector similarity between a first feature vector of the target POI and a second feature vector of at least one tag.

It should be noted that, the obtaining module 1, the mapping module 2 and the optimizing module 3 may be respectively configured to implement the actions at block S1, block S2 and block S3 in the above embodiments. A specific description of each module may be referred to the corresponding contents in the previous embodiments, which is not be elaborated here.

Figure 8A:
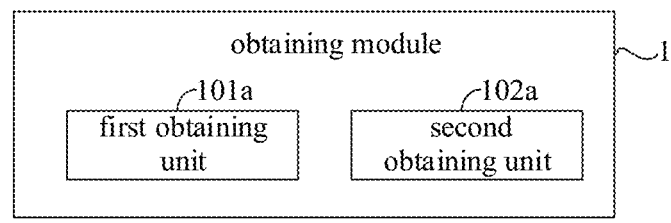
FIG. 8a is a block diagram illustrating an obtaining module according to an embodiment of the present disclosure.

FIG. 8a is a block diagram illustrating an obtaining module 1 according to an embodiment of the present disclosure. As illustrated in FIG. 8a, in some embodiments, the obtaining module 1 includes a first obtaining unit 101a and a second obtaining unit 102a.

The first obtaining unit 101a is configured to: for each POI, determine historical accessing users and/or historical search users corresponding to the POI, and aggregate user portraits of the historical accessing users and/or the historical search users corresponding to the POI to obtain the first portrait feature data of the POI.

The second obtaining unit 102a is configured to: for each tag, determine at least one POI corresponding to the tag, and generate the second portrait feature data of the tag based on first portrait feature data of the at least one POIs corresponding to the tag.

In some embodiments, the second obtaining unit 102a is configured to: for each tag, determine an average value of the first portrait feature data of the at least one POIs corresponding to the tag as the second portrait feature data of the tag.

The first obtaining unit 101a and the second obtaining unit 102a are respectively configured to implement the actions at block S101a and block S102a in the above embodiment.

Figure 8B:
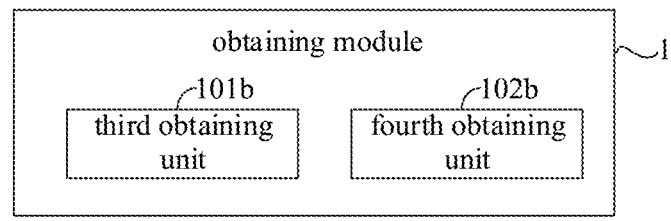
FIG. 8b is a block diagram illustrating an obtaining module according to another embodiment of the present disclosure.

FIG. 8b is a block diagram illustrating an obtaining module 1 according to another embodiment of the present disclosure. As illustrated in FIG. 8b, in some embodiments, the obtaining module 1 includes a third obtaining unit 101b and a fourth obtaining unit 102b.

The third obtaining unit 101b is configured to: for each POI, extract a descriptive feature of the POI from a first knowledge map obtained in advance to form the first portrait feature data of the POI.

The fourth obtaining unit 102b is configured to: for each tag, extract a descriptive feature of the tag from a second knowledge map obtained in advance to form the second portrait feature data of the tag.

The third obtaining unit 101b and the fourth obtaining unit 102b are respectively configured to implement the actions at block S101b and block S102b in the above embodiment.

Figure 9:
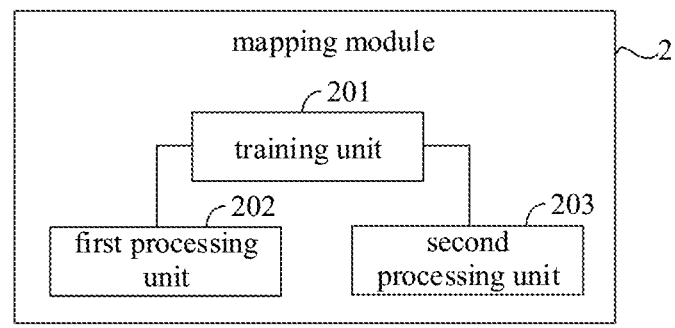
FIG. 9 is a block diagram illustrating a mapping module according to an embodiment of the present disclosure.

FIG. 9 is a block diagram illustrating a mapping module 2 according to an embodiment of the present disclosure. As illustrated in FIG. 9, in some embodiments, the mapping module 2 includes a training unit 201, a first processing unit 202, and a second processing unit 203.

The training unit 201 is configured to train a siamese neural network based on first sample portrait feature data and second sample portrait feature data to obtain a feature extraction model. The feature extraction model includes a first feature extraction sub-model and a second feature extraction sub-model. The first feature extraction sub-model is configured to map the first portrait feature data to the metric space, and the second feature extraction sub-model is configured to map the second portrait feature data to the metric space.

The first processing unit 202 is configured to input the first portrait feature data of each POI into the first feature extraction sub-model to obtain the first feature vector of each POI in the metric space.

The second processing unit 203 is configured to input the second portrait feature data of each tag into the second feature extraction sub-model to obtain the second feature vector of each tag in the metric space.

In some embodiments, the training unit 201 includes a modeling sub-unit (not illustrated), a defining sub-unit (not illustrated) and a training optimizing sub-unit (not illustrated).

The modeling sub-unit is configured to establish the siamese neural network. The siamese neural network includes a first sub-network model and a second sub-network model sharing parameters with each other. The first sub-network model is capable to map the first sample portrait feature data to the metric space, and the second sub-network model is capable to map the second sample portrait feature data to the metric space.

The defining sub-unit is configured to define an overall loss function.

The training optimizing sub-unit is configured to train the first sub-network model and the second sub-network model by utilizing the first sample portrait feature data, the second sample portrait feature data, and the overall loss function. The trained first sub-network model is the first feature extraction sub-model, and the trained second sub-network model is the second feature extraction sub-model.

In some embodiments, the overall loss function is denoted by:

$$L = \sum_{p_i \in P, t_j \in T} \text{loss}(\vec{p_i}, \vec{t_j}),$$

where, L represents an overall loss value of the feature extraction model, P represents a POI set including all the POIs, T represents a tag set including all the tags, $p_i$ represents an i-th POI in the POI set, $\vec{p}_i$ represents first portrait feature data of the i-th POI, $t_j$ represents a j-th tag in the tag set, $\vec{t}_j$ represents second portrait feature data of the j-th tag, and $\text{loss}(\vec{p}_i, \vec{t}_j)$ represents a loss function of the i-th POI and the j-th tag.

When the tag $t_j$ is not one of at least one of marked tags corresponding to the POI $p_i$, $\text{loss}(\vec{p}_i, \vec{t}_j)=1-\cos(F(\vec{p}_i),G(\vec{t}_j))$ is determined, and when the tag $t_j$ is one of the at least one of marked tags corresponding to the POI $p_i$, $\text{loss}(\vec{p}_i, \vec{t}_j)=\max(0,\cos(F(\vec{p}_i),G(\vec{t}_j))-m)$ is determined, where, $F(\vec{p}_i)$ represents a feature vector obtained after the first portrait feature data $\vec{p}_i$ is inputted to the first sub-network model, $G(\vec{t}_j)$ represents a feature vector obtained after the second portrait feature data $\vec{t}_j$ is inputted to the second sub-network model, $\cos(F(\vec{p}_i),G(\vec{t}_j))$ represents a cosine similarity between the feature vector $F(\vec{p}_i)$ and the feature vector $G(\vec{t}_j)$, and m represents a predefined parameter.

The training unit 201, the first processing 202, and the second processing unit 203 are respectively configured to implement the actions at block S201, block S202 and block S203 in the above embodiment. The modeling sub-unit, the defining sub-unit and the training optimizing sub-unit may be respectively configured to implement the actions at block S2011, block S2012 and block S2013 in the above embodiments.

Figure 10:
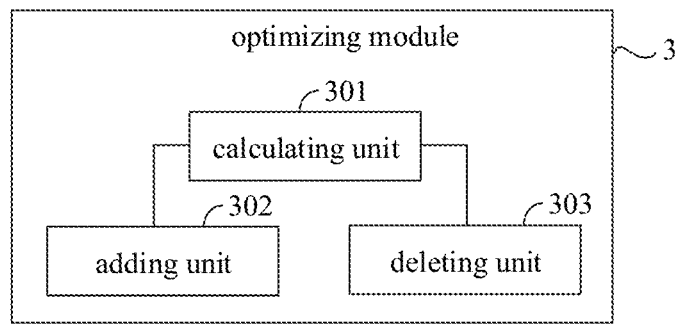
FIG. 10 is a block diagram illustrating an optimizing module according to an embodiment of the present disclosure.

FIG. 10 is a block diagram illustrating an optimizing module 3 according to an embodiment of the present disclosure. As illustrated in FIG. 10, in some embodiments, the optimizing module 3 includes a calculating unit 301, an adding unit 302, and a deleting unit 303.

The calculating unit 301 is configured to calculate a vector similarity between the first feature vector of the target POI and a second feature vector of a target tag.

The adding unit 302 is configured to: when the vector similarity between the first feature vector of the target POI and the second feature vector of the target tag is greater than a first preset threshold, and the target tag is not a marked tag corresponding to the target POI, add the target tag into the at least one marked tag corresponding to the target POI.

The deleting unit 303 is configured to: when the vector similarity between the first feature vector of the target POI and the second feature vector of the target tag is lower than a second preset threshold, and the target tag is the marked tag corresponding to the target POI, delete the target tag from the at least one marked tag corresponding to the target POI. The second preset threshold is less than or equal to the first preset threshold.

Figure 11:
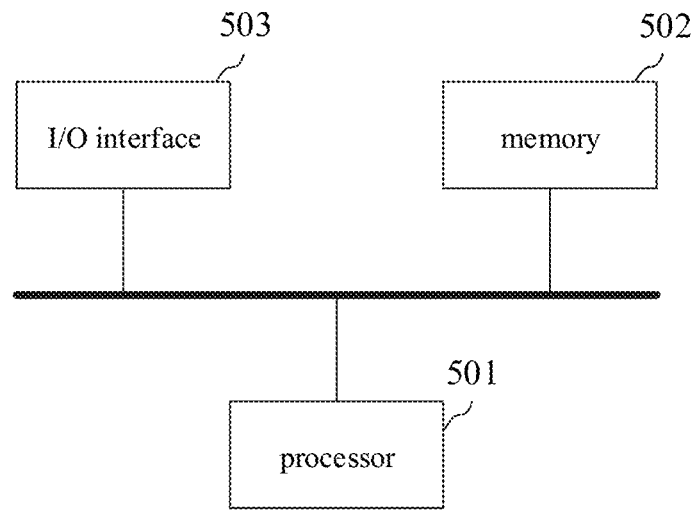
FIG. 11 is a block diagram illustrating an electronic device according to embodiments of the present disclosure.

FIG. 11 is a block diagram illustrating an electronic device according to embodiments of the present disclosure. As illustrated in FIG. 11, the electronic device includes one or more processors 501 and a memory 502. The memory 502 has one or more programs stored thereon. When the one or more programs are executed by the one or more processors, the one or more processors are caused to implement the method for optimizing the tag of the POI according to any one of the above embodiments.

In some embodiments, the electronic device also includes one or more I/O (input/output) interfaces 503, coupled between the processor 501 and the memory 502, and configured to implement information interaction between the processor 501 and the memory 502.

The processor 501 is a component with data processing capability, including but not limited to a central processing unit (CPU). The memory 502 is a component with data storage capability, including but not limited to a random access memory (RAM, more specifically a SDRAM (synchronous dynamic random-access memory), a DDR (double data rate), etc.), a read-only memory (ROM), an electrically erasable programmable read-only memory (EEPROM), and a flash memory. The I/O interface 503 is coupled between the processor 501 and the memory 502, to implement the information interaction between the processor 501 and the memory 502. The I/O interface may be, including but not limited to, a data bus.

In some embodiments, the processor 501, the memory 502, and the I/O interface 503 are coupled to each other by a bus 504, and further coupled to other components of the electronic device 800.

Embodiments of the present disclosure provide a computer readable medium having a computer program stored thereon. The computer program is configured to implement the method for optimizing the tag of the POI according to any one of the above embodiments when executed.

It may be understood by the skilled in the art that, all the above methods or some of the functional modules/units in the device, the steps, and the system may be implemented as software, firmware, hardware and appropriate combinations thereof. In a hardware implementation, the division among the functional modules/units mentioned in the above description does not necessarily correspond to the division of physical components. For example, one physical component may have a plurality of functions, or one function or one step may be cooperatively performed by several physical components. Some or all of the physical components may be implemented as the software executed by a processor, such as a central processing unit, a digital signal processor or a microprocessor, as hardware, or as an integrated circuit, such as an application specific integrated circuit. Such software may be distributed on a computer-readable medium. The computer-readable medium may include a computer storage medium (or non-transitory medium) and a communication medium (or transitory medium). As well known to the skilled in the art, the term "computer storage medium" includes a volatile and non-volatile medium and a removable and non-removable medium implemented in any method or technology for storing information such as computer readable instructions, data structures, program modules or other data. The computer storage medium includes, but is not limited to, a storage technology such as a RAM, a ROM, an EEPROM, or a flash memory, an optical disk storage such as a CD-ROM (compact disc read-only memory) or a digital versatile disk (DVD), a magnetic storage device such as a magnetic box, a magnetic tape or magnetic disk storage, or any other medium that may be used to store desired information and accessed by a computer. Furthermore, it is well known to the skilled in the art that, the communication medium typically includes the computer readable instructions, the data structures, the program modules or other data in a modulated data signal such as a carrier wave or other transmission mechanism, and may include any information delivery media.

Exemplary embodiments are disclosed herein. Although detailed terms are employed, the terms are merely used and should merely be interpreted in a general illustrative sense, and are not used for the purpose of limitation. In some embodiments, it is obvious to the skilled in the art that the features, characteristics and/or elements described in connection with detailed embodiments may be used alone or in combination with features, characteristics and/or elements described in connection with other embodiments, unless explicitly stated otherwise. Therefore, it may be understood by the skilled in the art that, various changes in form and details may be made without departing from the scope of the present disclosure as set forth in the appended claims.

What is claimed is:

1. A method for optimizing a tag of a point of interest (POI), executed by a server, comprising:
    obtaining first portrait feature data of each POI in a plurality of POIs and second portrait feature data of each tag in a plurality of marked tags corresponding to the plurality of POIs;
    inputting the first portrait feature data of each POI and the second portrait feature data of each tag to a feature extraction model to be mapped to a metric space to obtain a first feature vector of each POI and a second feature vector of each tag, comprising: training a siamese neural network based on first sample portrait feature data and second sample portrait feature data to obtain the feature extraction model, the feature extraction model comprising a first feature extraction sub-model and a second feature extraction sub-model, the first feature extraction sub-model being configured to map the first portrait feature data to the metric space, and the second feature extraction sub-model being configured to map the second portrait feature data to the metric space; inputting the first portrait feature data of each POI into the first feature extraction sub-model to obtain the first feature vector of each POI in the metric space; and inputting the second portrait feature data of each tag into the second feature extraction sub-model to obtain the second feature vector of each tag in the metric space, wherein a first number of dimensions of the first feature vector and a second number of dimensions of the second feature vector are adaptively determined during the training;
    optimizing at least one marked tag corresponding to a target POI based on a vector similarity between a first feature vector of the target POI and a second feature vector of at least one tag; and
    providing a service by a map application based on the at least one marked tag optimized,
    wherein optimizing the at least one marked tag corresponding to the target POI based on the vector similarity between the first feature vector of the target POI and the second feature vector of the at least one tag comprises:
    calculating a vector similarity between the first feature vector of the target POI and a second feature vector of a target tag;
    when the vector similarity between the first feature vector of the target POI and the second feature vector of the target tag is greater than a first preset threshold, and the target tag is not a marked tag corresponding to the target POI, adding the target tag into the at least one marked tag corresponding to the target POI; and
    when the vector similarity between the first feature vector of the target POI and the second feature vector of the target tag is lower than a second preset threshold, and the target tag is the marked tag corresponding to the target POI, deleting the target tag from the at least one marked tag corresponding to the target POI;
    the second preset threshold being less than the first preset threshold,
    wherein obtaining the first portrait feature data of each POI in the plurality of POIs and the second portrait feature data of each tag in the plurality of marked tags corresponding to the plurality of POIs comprises:
    for each POI, determining historical accessing users and/or historical search users corresponding to the POI, and aggregating user portraits of the historical accessing users and/or the historical search users corresponding to the POI to obtain the first portrait feature data of the POI; and
    for each tag, determining at least one POI corresponding to the tag, and generating the second portrait feature data of the tag based on first portrait feature data of the at least one POIs corresponding to the tag.

2. The method of claim 1, wherein training the siamese neural network based on the first sample portrait feature data and the second sample portrait feature data to obtain the feature extraction model comprises:
    establishing the siamese neural network, the siamese neural network comprising a first sub-network model and a second sub-network model sharing parameters with each other, the first sub-network model being capable to map the first sample portrait feature data to the metric space, and the second sub-network model being capable to map the second sample portrait feature data to the metric space;
    defining an overall loss function; and
    training the first sub-network model and the second sub-network model by utilizing the first sample portrait feature data, the second sample portrait feature data, and the overall loss function, the trained first sub-network model being the first feature extraction sub-model, and the trained second sub-network model being the second feature extraction sub-model.

3. The method of claim 2, wherein the overall loss function is denoted by:

$$L = \sum_{p_i \in P, t_j \in T} \text{loss}(\vec{p_i}, \vec{t_j}),$$

where, L represents an overall loss value of the feature extraction model, P represents a POI set including all the POIs, T represents a tag set including all the tags, $p_i$ represents an i-th POI in the POI set, $\vec{p}_i$ represents first portrait feature data of the i-th POI, $t_j$ represents a j-th tag in the tag set, $\vec{t}_j$ represents second portrait feature data of the j-th tag, and $\text{loss}(\vec{p}_i, \vec{t}_j)$ represents a loss function of the i-th POI and the j-th tag;

when the tag $t_j$ is not one of at least one of marked tags corresponding to the POI $p_i$, determining $$\text{loss}(\vec{p}_i, \vec{t}_j) = 1 - \cos(F(\vec{p}_i), G(\vec{t}_j)); \text{ and}$$

when the tag $t_j$ is one of the at least one of marked tags corresponding to the POI $p_i$, determining $$\text{loss}(\vec{p}_i, \vec{t}_j) = \max(0, \cos(F(\vec{p}_i), G(\vec{t}_j)) - m),$$

where, $F(\vec{p}_i)$ represents a feature vector obtained after the first portrait feature data $\vec{p}_i$ is inputted to the first sub-network model, $G(\vec{t}_j)$, represents a feature vector obtained after the second portrait feature data $\vec{t}_j$ is inputted to the second sub-network model, $\cos(F(\vec{p}_i), G(\vec{t}_j))$ represents a cosine similarity between the feature vector $F(\vec{p}_i)$ and the feature vector $G(\vec{t}_j)$, and m represents a predefined parameter.

4. The method of claim 1, wherein generating the second portrait feature data of the tag based on the first portrait feature data of the at least one POIs corresponding to the tag comprises:
determining an average value of the first portrait feature data of the at least one POIs corresponding to the tag as the second portrait feature data of the tag.

5. The method of claim 1, wherein obtaining the first portrait feature data of each POI in the plurality of POIs and the second portrait feature data of each tag in the plurality of marked tags corresponding to the plurality of POIs comprises:
for each POI, extracting a descriptive feature of the POI from a first knowledge map obtained in advance to form the first portrait feature data of the POI; and
for each tag, extracting a descriptive feature of the tag from a second knowledge map obtained in advance to form the second portrait feature data of the tag.

6. The method of claim 1, wherein the target POI is each POI in the plurality of POIs.

7. An electronic device, comprising:
one or more processors; and
a storage device having one or more programs stored thereon,
wherein when the one or more programs are executed by the one or more processors, the one or more processors are caused to implement a method for optimizing a tag of a point of interest, the method comprising:
obtaining first portrait feature data of each POI in a plurality of POIs and second portrait feature data of each tag in a plurality of marked tags corresponding to the plurality of POIs;
inputting the first portrait feature data of each POI and the second portrait feature data of each tag to a feature extraction model to be mapped to a metric space to obtain a first feature vector of each POI and a second feature vector of each tag, comprising: training a siamese neural network based on first sample portrait feature data and second sample portrait feature data to obtain the feature extraction model, the feature extraction model comprising a first feature extraction sub-model and a second feature extraction sub-model, the first feature extraction sub-model being configured to map the first portrait feature data to the metric space, and the second feature extraction sub-model being configured to map the second portrait feature data to the metric space; inputting the first portrait feature data of each POI into the first feature extraction sub-model to obtain the first feature vector of each POI in the metric space; and inputting the second portrait feature data of each tag into the second feature extraction sub-model to obtain the second feature vector of each tag in the metric space, wherein a first number of dimensions of the first feature vector and a second number of dimensions of the second feature vector are adaptively determined during the training;
optimizing at least one marked tag corresponding to a target POI based on a vector similarity between a first feature vector of the target POI and a second feature vector of at least one tag; and
providing a service by a map application based on the at least one marked tag optimized,
wherein optimizing the at least one marked tag corresponding to the target POI based on the vector similarity between the first feature vector of the target POI and the second feature vector of the at least one tag comprises:
calculating a vector similarity between the first feature vector of the target POI and a second feature vector of a target tag;
when the vector similarity between the first feature vector of the target POI and the second feature vector of the target tag is greater than a first preset threshold, and the target tag is not a marked tag corresponding to the target POI, adding the target tag into the at least one marked tag corresponding to the target POI; and
when the vector similarity between the first feature vector of the target POI and the second feature vector of the target tag is lower than a second preset threshold, and the target tag is the marked tag corresponding to the target POI, deleting the target tag from the at least one marked tag corresponding to the target POI;
the second preset threshold being less than the first preset threshold,
wherein obtaining the first portrait feature data of each POI in the plurality of POIs and the second portrait feature data of each tagin the plurality of marked tags corresponding to the plurality of POIs comprises:
for each POI, determining historical accessing users and/or historical search users corresponding to the POI, and aggregating user portraits of the historical accessing users and/or the historical search users corresponding to the POI to obtain the first portrait feature data of the POI; and
for each tag, determining at least one POI corresponding to the tag, and generating the second portrait feature data of the tag based on first portrait feature data of the at least one POIs corresponding to the tag.

8. The electronic device of claim 7, wherein training the siamese neural network based on the first sample portrait feature data and the second sample portrait feature data to obtain the feature extraction model comprises:

establishing the siamese neural network, the siamese neural network comprising a first sub-network model and a second sub-network model sharing parameters with each other, the first sub-network model being capable to map the first sample portrait feature data to the metric space, and the second sub-network model being capable to map the second sample portrait feature data to the metric space;

defining an overall loss function; and training the first sub-network model and the second sub-network model by utilizing the first sample portrait feature data, the second sample portrait feature data, and the overall loss function, the trained first sub-network model being the first feature extraction sub-model, and the trained second sub-network model being the second feature extraction sub-model.

9. The electronic device of claim 8, wherein the overall loss function is denoted by:

$$L = \sum_{p_i \in P, t_j \in T} \text{loss}(\vec{p_i}, \vec{t_j}),$$

where, L represents an overall loss value of the feature extraction model, P represents a POI set including all the POIs, T represents a tag set including all the tags, $p_i$ represents an i-th POI in the POI set, $\vec{p}_i$ represents first portrait feature data of the i-th POI, $t_j$ represents a j-th tag in the tag set, $\vec{t}_j$ represents second portrait feature data of the j-th tag, and $\text{loss}(\vec{p}_i, \vec{t}_j)$ represents a loss function of the i-th POI and the j-th tag;

when the tag $t_j$ is not one of at least one of marked tags corresponding to the POI $p_i$, determining $$\text{loss}(\vec{p}_i, \vec{t}_j) = 1 - \cos(F(\vec{p}_i), G(\vec{t}_j)); \text{ and}$$

when the tag $t_j$ is one of the at least one of marked tags corresponding to the POI $p_i$, determining $$\text{loss}(\vec{p}_i, \vec{t}_j) = \max(0, \cos(F(\vec{p}_i), G(\vec{t}_j)) - m),$$

where, $F(\vec{p}_i)$ represents a feature vector obtained after the first portrait feature data $\vec{p}_i$ is inputted to the first sub-network model, $G(\vec{t}_j)$ represents a feature vector obtained after the second portrait feature data $\vec{t}_j$ is inputted to the second sub-network model, $\cos(F(\vec{p}_i), G(\vec{t}_j))$ represents a cosine similarity between the feature vector $F(\vec{p}_i)$ and the feature vector $G(\vec{t}_j)$, and m represents a predefined parameter.

10. The electronic device of claim 7, wherein generating the second portrait feature data of the tag based on the first portrait feature data of the at least one POIs corresponding to the tag comprises:

determining an average value of the first portrait feature data of the at least one POIs corresponding to the tag as the second portrait feature data of the tag.

11. The electronic device of claim 7, wherein obtaining the first portrait feature data of each POI in the plurality of POIs and the second portrait feature data of each tag in the plurality of marked tags corresponding to the plurality of POIs comprises:

for each POI, extracting a descriptive feature of the POI from a first knowledge map obtained in advance to form the first portrait feature data of the POI; and for each tag, extracting a descriptive feature of the tag from a second knowledge map obtained in advance to form the second portrait feature data of the tag.

12. The electronic device of claim 7, wherein the target POI is each POI in the plurality of POIs.

13. A non-transitory computer readable medium having a computer program stored thereon, wherein when the computer program is executed by a processor, a method for optimizing a tag of a point of interest is implemented, the method comprising:

obtaining first portrait feature data of each POI in a plurality of POIs and second portrait feature data of each tag in a plurality of marked tags corresponding to the plurality of POIs;

inputting the first portrait feature data of each POI and the second portrait feature data of each tag to a feature extraction model to be mapped to a metric space to obtain a first feature vector of each POI and a second feature vector of each tag, comprising: training a siamese neural network based on first sample portrait feature data and second sample portrait feature data to obtain the feature extraction model, the feature extraction model comprising a first feature extraction sub-model and a second feature extraction sub-model, the first feature extraction sub-model being configured to map the first portrait feature data to the metric space, and the second feature extraction sub-model being configured to map the second portrait feature data to the metric space; inputting the first portrait feature data of each POI into the first feature extraction sub-model to obtain the first feature vector of each POI in the metric space; and inputting the second portrait feature data of each tag into the second feature extraction sub-model to obtain the second feature vector of each tag in the metric space, wherein a first number of dimensions of the first feature vector and a second number of dimensions of the second feature vector are adaptively determined during the training;

optimizing at least one marked tag corresponding to a target POI based on a vector similarity between a first feature vector of the target POI and a second feature vector of at least one tag; and providing a service by a map application based on the at least one marked tag optimized, wherein optimizing the at least one marked tag corresponding to the target POI based on the vector similarity between the first feature vector of the target POI and the second feature vector of the at least one tag comprises:

calculating a vector similarity between the first feature vector of the target POI and a second feature vector of a target tag;

when the vector similarity between the first feature vector of the target POI and the second feature vector of the target tag is greater than a first preset threshold, and the target tag is not a marked tag corresponding to the target POI, adding the target tag into the at least one marked tag corresponding to the target POI; and when the vector similarity between the first feature vector of the target POI and the second feature vector of the target tag is lower than a second preset threshold, and the target tag is the marked tag corresponding to the target POI, deleting the target tag from the at least one marked tag corresponding to the target POI;

the second preset threshold being less than the first preset threshold, wherein obtaining the first portrait feature data of each POI in the plurality of POIs and the second portrait feature data of each tagin the plurality of marked tags corresponding to the plurality of POIs comprises:

for each POI, determining historical accessing users and/or historical search users corresponding to the POI, and aggregating user portraits of the historical accessing users and/or the historical search users corresponding to the POI to obtain the first portrait feature data of the POI; and for each tag, determining at least one POI corresponding to the tag, and generating the second portrait feature data of the tag based on first portrait feature data of the at least one POIs corresponding to the tag.

* * * * *